United States Patent [19]

Miyakawa

[11] Patent Number: 5,184,877
[45] Date of Patent: Feb. 9, 1993

[54] HYDRAULIC BRAKING PRESSURE CONTROL DEVICE

[75] Inventor: Yoshitaka Miyakawa, Wako, Japan

[73] Assignee: Honda Giken Kogyo Kabushiki Kaisha, Tokyo, Japan

[21] Appl. No.: 769,701

[22] Filed: Oct. 2, 1991

[30] Foreign Application Priority Data

Oct. 9, 1990 [JP] Japan ................................ 2-271227

[51] Int. Cl.$^5$ ........................... B60T 8/32; B60T 8/46
[52] U.S. Cl. ............................. 303/113.2; 303/115.2; 303/119.1; 188/345; 188/162
[58] Field of Search ............... 303/113 TR, 113 TB, 303/115 EC, 119 R, 6.01, 50–52, 113 R, 113 AP, 114 R, 114 PB, 115 R, 115 PP, 115 FM, 116 R; 188/345, 181 A, 358, 359, 162; 60/579, 581, 582; 180/197

[56] References Cited

U.S. PATENT DOCUMENTS

| | | | |
|---|---|---|---|
| 3,420,580 | 1/1969 | Dymond | 303/115 EC |
| 3,549,210 | 12/1970 | Birge et al. | 303/115 EC |
| 4,730,877 | 3/1988 | Seibert et al. | 188/358 X |
| 4,812,723 | 3/1989 | Shimizu | 303/115 EC |
| 4,957,331 | 9/1990 | Burton et al. | 303/115 EC |
| 5,011,237 | 4/1991 | Matouka et al. | 303/115 EC |
| 5,026,125 | 6/1991 | Matouka et al. | 303/115 EC |
| 5,042,885 | 8/1991 | Villec | 303/115 EC |

FOREIGN PATENT DOCUMENTS

| | | | |
|---|---|---|---|
| 3803079 | 8/1989 | Fed. Rep. of Germany | 303/115 EC |
| 63-8058 | 1/1988 | Japan | |
| 2188111 | 9/1989 | United Kingdom | 303/115 EC |

Primary Examiner—Douglas C. Butler
Attorney, Agent, or Firm—Armstrong, Westerman, Hattori, McLeland & Naughton

[57] ABSTRACT

A hydraulic braking pressure control device which includes a bottomed cylindrically-shaped cylinder body, a free piston slidably received in the cylinder body to define a first control chamber leading to a first brake device between the free piston and a closed end of the cylinder body, a control piston slidably received in the cylinder body to define a second control chamber leading to a second brake device between the control chamber and the free piston, and a positioning control device capable of controlling the axial position of the control piston. The first and second control chambers are independently connected to first and second hydraulic braking pressure supply systems through cutoff valves capable of being switched-over between a connecting state and a disconnecting state. By controlling the axial position of the control piston by the positioning control device with the cut-off valves closed, the free piston can be operated in an axial direction so as to balance hydraulic pressures in the first and second control chambers, thereby controlling the hydraulic pressures in the control chambers to provide a simultaneous control of hydraulic braking pressures for the first and second brake devices.

20 Claims, 2 Drawing Sheets

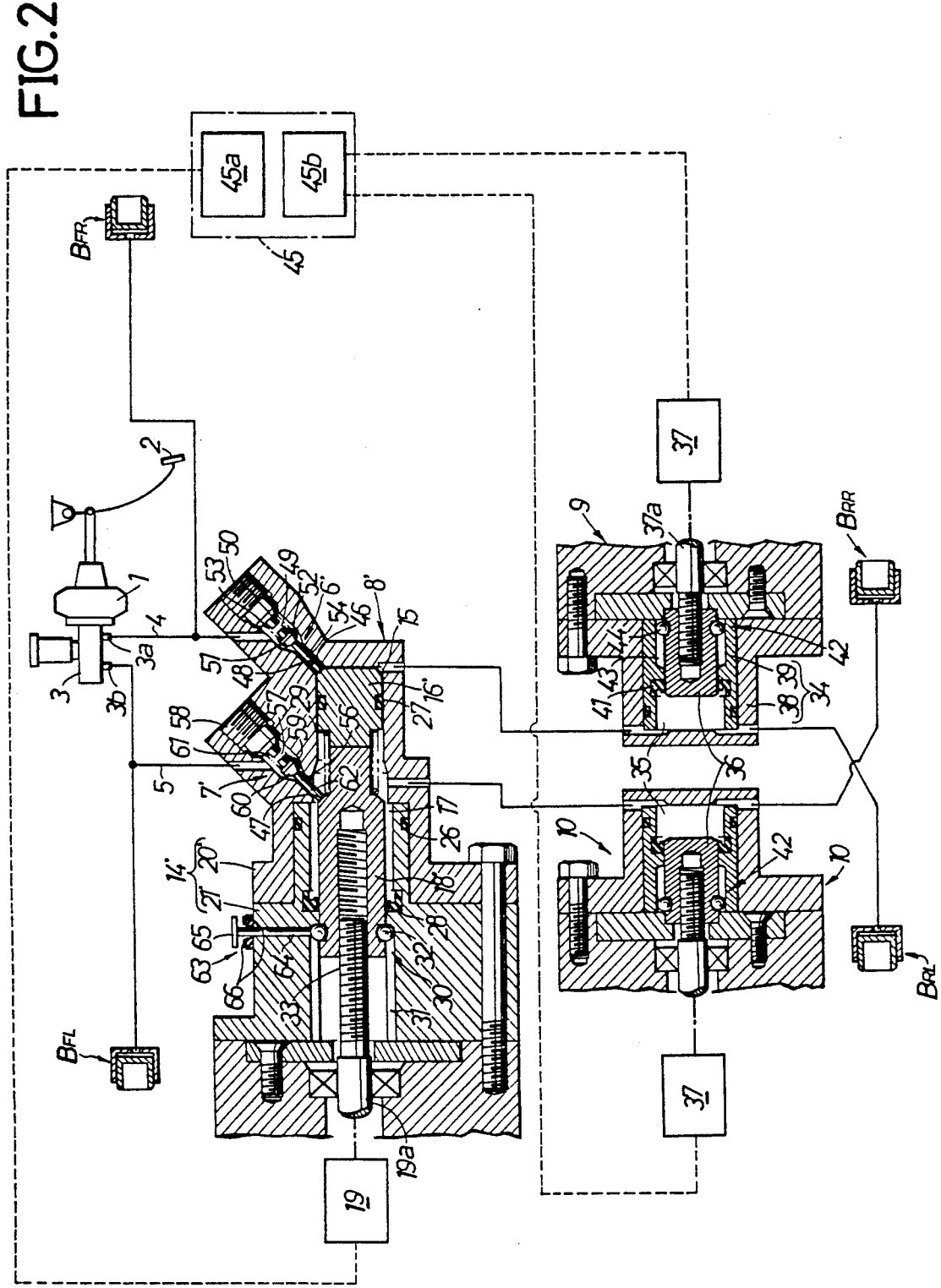

HYDRAULIC BRAKING PRESSURE CONTROL DEVICE

BACKGROUND OF THE INVENTION

1. FIELD OF THE INVENTION

The field of the present invention is hydraulic braking pressure control devices, and more particularly, hydraulic braking pressure control devices capable of providing an anti-lock control of the hydraulic braking pressures for a plurality of brake devices.

2. DESCRIPTION OF THE PRIOR ART

A hydraulic braking pressure control device capable of providing an anti-lock control is disclosed, for example, in Japanese Patent Application Laid-open No. 8058/88.

In the prior art hydraulic braking pressure control systems, however, one pressure control device is required for each of the brake devices, and therefore, four hydraulic braking pressure control devices are required to provide an anti-lock control of hydraulic braking pressures for the brake devices for wheels of a four-wheel vehicle. In order to decrease the number of parts, it is desirable that hydraulic braking pressures for a plurality of brake devices can be controlled by a single hydraulic braking pressure control device.

SUMMARY OF THE INVENTION

Accordingly, it is an object of the present invention to provide a hydraulic braking pressure control device designed so that hydraulic braking pressures for at least a pair of brake devices can be controlled by a simplified system.

To achieve the above object, according to the present invention, there is provided a hydraulic braking pressure control device comprising a bottomed cylindrically-shaped cylinder body, a free piston slidably received in the cylinder body to define a first control chamber leading to a first brake device between the free piston and a closed end of the cylinder body, a control piston slidably received in the cylinder body to define a second control chamber leading to a second brake device between the control piston and the free piston, and a positioning control means capable of controlling the axial position of the control piston, the first and second control chambers being independently connected to first and second hydraulic braking pressure supply systems through cut-off valves capable of being switched-over between a connecting state and a disconnecting state.

With the above construction, by controlling the axial position of the control piston by the positioning control means with the cut-off valves closed, the free piston can be operated in an axial direction so as to balance hydraulic pressures in the first and second control chambers, thereby controlling the hydraulic pressures in the control chambers to provide a simultaneous control of hydraulic braking pressures for the first and second brake devices.

The above and other objects, features and advantages of the invention will become apparent from the following description of the preferred embodiments, taken in conjunction with the accompanying drawings.

BRIEF DESCRIPTION OF THE DRAWINGS

FIG. 2 is a diagram of a hydraulic braking pressure circuit according to a second embodiment of the present invention.

DESCRIPTION OF THE PREFERRED EMBODIMENTS

Figure 1:
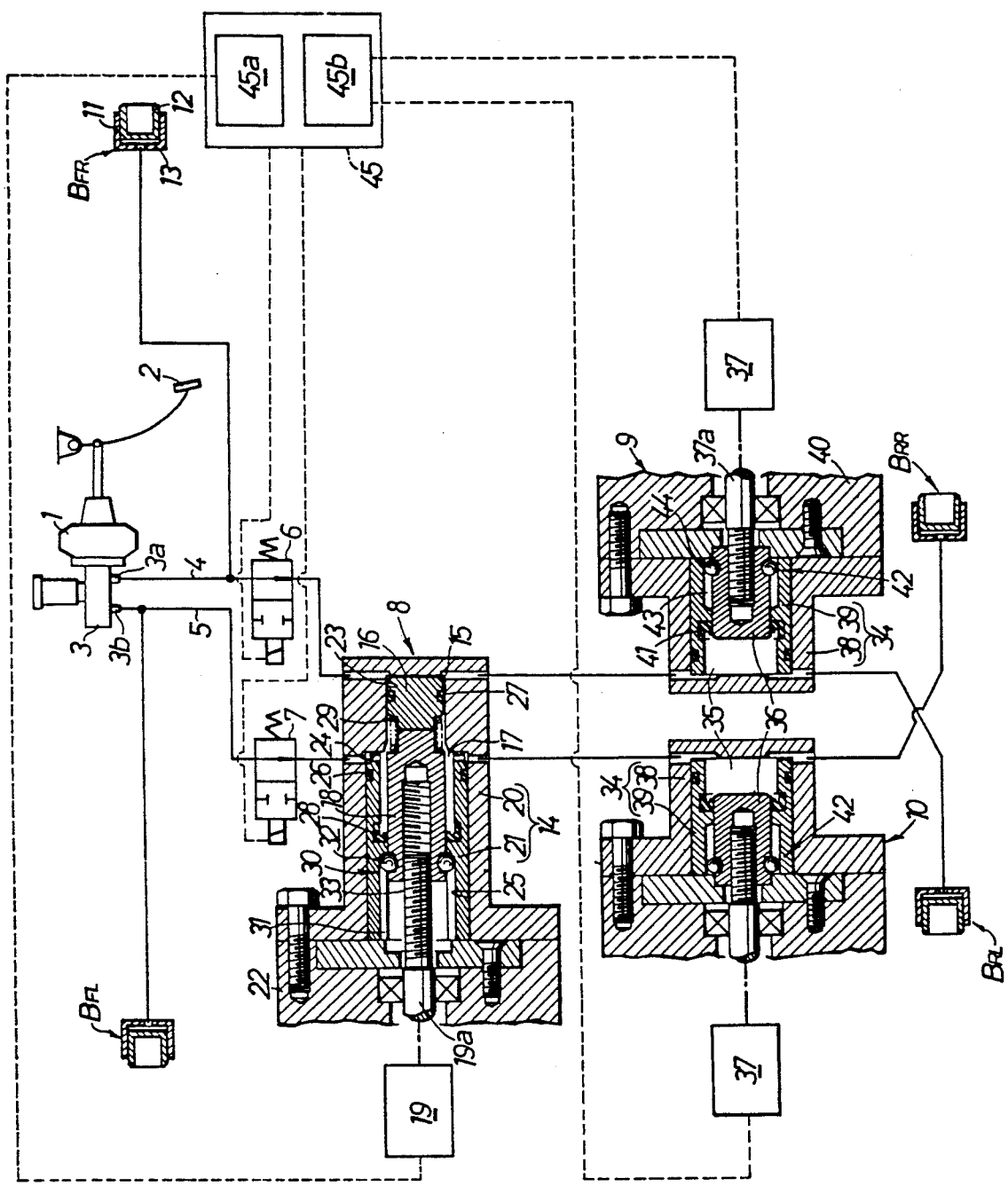
FIG. 1 is a diagram of a hydraulic braking pressure circuit according to a first embodiment of the present invention.

The present invention will be described by way of embodiments applied to a rear wheel drive vehicle in connection with the drawings.

FIG. 1 illustrates a first embodiment of the present invention, wherein a first hydraulic braking pressure supply system 4 leading to an a right front wheel brake device $B_{FR}$ is connected to output port 3a in a tandem type master cylinder 3 which is connected to a brake pedal 2 through a vacuum booster 1. A second hydraulic braking pressure supply system 5 leading to a left front wheel brake device $B_{FL}$ is connected to the other output port 3b. The first hydraulic braking pressure supply system 4 and the second hydraulic braking pressure supply system 5 are connected to a hydraulic braking pressure control device 8 according to this embodiment, with solenoid switchover valves 6 and 7 as cut-off valves interposed therebetween, respectively, so that a hydraulic braking pressure fed from the first hydraulic braking pressure supply system 4 and controlled in the hydraulic braking pressure control device 8 is supplied to a left rear brake device $B_{RL}$ as a first brake device, and a hydraulic pressure fed from the second hydraulic braking pressure supply system 5 and controlled in the hydraulic braking pressure control device 8 is supplied to a right rear brake device $B_{RR}$ as a second brake device. Moreover, a traction control device 9 is interposed between the hydraulic braking pressure control device 8 and the left rear wheel brake device $B_{RL}$, and a traction control device 10 is interposed between the hydraulic braking pressure control device 8 and the right rear wheel brake device $B_{RR}$.

A wheel cylinder in each of the brake devices $B_{FR}$, $B_{FL}$, $B_{RR}$ and $B_{RL}$ includes a cylinder body 11 and a braking piston 12 slidably received in the cylinder body 11 and exhibits a braking force corresponding to a hydraulic pressure in a hydraulic braking pressure chamber 13 defined between the cylinder body 11 and the braking piston 12.

The hydraulic braking pressure control device 8 comprises a bottomed cylindrically-shaped cylinder body 14, a free piston 16 slidably received in the cylinder body 14 to define a first control chamber 15 between a closed end of the cylinder body 14 and the piston 16, a control piston 18 slidably received in the cylinder body 14 to define a second control chamber 17 between the control piston 18 and the free piston 16, and a motor 19 as a positioning control means connected to the control piston 18 to control the axial position of the control piston 18.

The cylinder body 14 is comprised of a cylindrical member 21 fitted into and fixed in a bottomed cylindrical member 20 through a fitment structure (not shown) for inhibited relative rotation, and is fixed to a support 22. More specifically, the bottomed cylindrical member 20 is provided with a bottomed bore which comprises, from its closed end side, a small diameter bore portion 23, and a large diameter bore portion 25 coaxially connected to the small diameter bore portion 23 through a step 24. The cylindrical member 21 is fitted into and fixed in the large diameter bore portion 25 with its fore end abu-ting against the step 24. An O-ring 26 is mounted around an outer surface of the cylindrical member 21 to come into contact with an inner surface of the large diameter bore portion 25.

The free piston 16 is slidably received in the small diameter bore portion 23, and an O-ring 27 is mounted around an outer surface of the free piston 16 to come into contact with an inner surface of the small diameter bore portion 23. The control piston 18 is slidably received in the cylindrical member 21 through a feed screw 33, and a sealing member 28 is mounted in an inner surface of the cylindrical member 21 at its intermediate portion to come into contact with an outer surface of the control piston 18. A spring 29 is mounted in a compressed manner between the free piston 16 and the control piston 18 for exhibiting a spring force in a direction to bias the pistons 16 and 18 away from each other. The spring 29 has a load set at a small level, relative to the hydraulic pressures present in a braking system.

The motor 19 is disposed within the support 22 coaxially with the free piston 16 and the control piston 18 and has an output shaft 19a threadedly inserted into the control piston 18. A retaining means 30 is mounted between the control piston 18 and cylindrical member 21 to permit an axial movement of the control piston 18 but inhibit the rotation thereof. The retaining means 30 is comprised of a pair of retaining grooves 31 provided to extend axially in the inner surface of the cylindrical member 21 at its portion closer to the support 22 than the sealing member 28, and a pair of spheres 32 fitted in an outer surface of the control piston 18 at its end closer to the support 22, so that they are fitted into the retaining grooves 31, respectively. Such structure ensures that the control piston 18 is axially reciprocally moved by the feed screw 33 in accordance with a bidirectional rotation of the motor 19, and a thrust load on the control piston 18 when the motor is inoperative is received by the feed screw 33 to inhibit the movement of the control piston 18.

The first control chamber 15 is connected to the first hydraulic pressure supply system 4 through the solenoid switchover valve 6, while the second control chamber 17 is connected to the second hydraulic pressure supply system 5 through the solenoid switchover valve 7. Each of the solenoid switchover valves 6 and 7 is capable of being switched over between an opened position in which the hydraulic pressure supply system 4, 5 is put into communication with the corresponding control chamber 15, 17 in a deenergized state of the solenoid switchover valve, and a closed position in which the hydraulic pressure supply system 4, 5 is put out of communication with the corresponding control chamber 15, 17 in an energized state of the solenoid switchover valve.

The first control chamber 15 is also connected to the left rear wheel brake device $B_{RL}$ through the traction control device 9, while the second control chamber 17 is also connected to the right rear wheel brake device $B_{RR}$ through the traction control device 10. The traction control devices 9 and 10 basically have the same structure, and therefore, only the structure of the traction control device 9 will be described below. With respect to the traction control device 10, the essential portions corresponding to those in the traction control device 9 are only shown with like reference characters affixed thereto.

The traction control device 9 comprises a bottomed cylindrically-shaped cylinder body 34, a control piston 36 slidably received in the cylinder body 34 to define, between the control piston 36 and a closed end of the cylinder body 34, a control chamber 35 leading to the first control chamber 15 and the left rear wheel brake device $B_{RL}$, and a motor 37 connected to the control piston 36 to reciprocally drive the control piston 36 in an axial direction. The cylinder body 34 is comprised of a cylindrical member 39 fitted into and fixed in a bottomed cylindrical member 38 through fitment structure (not shown) for inhibited relative rotation, and is fixed to a support 40. The control piston 36 is slidably received in the cylindrical member 39, and a sealing member 41 is mounted in an inner surface of the cylindrical member 39 at its intermediate portion to come into contact with an outer surface of the control piston 36.

The motor 37 is disposed within the support 40 coaxially with the control piston 36 and has an output shaft 37a threadedly inserted into the control piston 36. Moreover, a retaining means 42 is mounted between the control piston 36 and the cylindrical member 39 to permit an axial movement of the control piston 36 but inhibit the rotation thereof. The retaining means 42 is comprised of a pair of retaining grooves 43 provided to extend axially in the inner surface of the cylindrical member 39 at its portion closer to the support 40 than the sealing member 41, and a pair of spheres 32 fitted in an outer surface of the control piston 18 at its end closer to the support 22, so that they are fitted into the retaining grooves 43, respectively. The control piston 36 can be reciprocally moved in an axial direction in accordance with a bidirectional rotation of the motor 37.

The switching-over of the solenoid switchover valves 6 and 7 and the operations of the motor 19 in the hydraulic braking pressure control device 8 and the motors 37 in the traction control devices 9 and 10 are controlled by a control unit 45 comprising a microcomputer. The control unit 45 includes an anti-lock control section 45a and a traction control section 45b.

The operation of the first embodiment will be described below. During normal braking, the solenoid switchover valves 6 and 7 are in their opened states. The control piston 18 in the hydraulic braking pressure control device 8 has been advanced to its advance limit position, and the control pistons 36 in the traction control devices 9 and 10 have been retreated to their retreat limit positions. If the brake pedal 2 is depressed for braking in such a condition, a hydraulic braking pressure delivered from the one output port 3a in the master cylinder 3 is supplied to the right front wheel brake device $B_{FR}$ through the first hydraulic braking pressure supply system 4 and to the left rear wheel brake device $B_{RL}$ through the solenoid switchover valve 6, the first control chamber 15 in the hydraulic braking pressure control device 8, and the control chamber 35 in the traction control device 9. A hydraulic braking pressure delivered from the other output port 3b is supplied to the left front wheel brake device $B_{FL}$ through the second hydraulic braking pressure supply system 5 and to the right rear wheel brake device $B_{RR}$ through the solenoid switchover valve 7, the second control chamber 17 in the hydraulic braking pressure control device 8 and the control chamber 35 in the traction control device 10.

If any of the left and right rear wheels is determined by a sensing means (not shown) as being about to enter a locked state during braking, then the solenoid switchover valves 6 and 7 are energized and thereby closed to cut off the communication between the hydraulic braking pressure supply systems 4 and 5 and the control chambers 15 and 17 in the hydraulic braking pressure control device 8 and to actuate the motor 19 to retreat the control piston 18. This causes the volume of the second control chamber 17 to be increased and the hydraulic pressure in the second chamber 17 to be reduced, so that the free piston 16 is also retreated therewith to a position in which the hydraulic pressures in the first and second control chambers 15 and 17 are balanced. Thus, the hydraulic braking pressure for the rear brake device $B_{RR}$, $B_{RL}$ is decreased to prevent the associated wheel from entering a locked state. The decrease, maintaining, and increase of the hydraulic braking pressure can be freely controlled by driving the control piston 18 in the axial direction by the motor 19, so that the hydraulic braking pressures in the control chambers 15 and 17 and thus for the rear wheel brake devices $B_{RR}$ and $B_{RL}$ can be controlled and balanced with each other in any condition.

In this manner, anti-lock control for the rear wheel brake devices $B_{RL}$ and $B_{RR}$ can be effected by the single hydraulic braking pressure control device 8 common to the rear brake devices $B_{RL}$ and $B_{RR}$.

In conducting traction control for the driving or rear wheels, the solenoid switchover valve 6, 7 is closed, and associated control piston 36 is advanced by the motor 37 in the traction control device 9, 10, on the side of the wheel which is to be subjected to the traction control. This ensures that the braking force of the brake devices $B_{RR}$ and $B_{RL}$ can be increased as a result of reduction of the volume of the control chamber 35, thereby avoiding an excessive slipping of the driving wheels by a reduction in torque of the driving wheels.

FIG. 2 illustrates a second embodiment of the present invention, wherein portions or components corresponding to those in the above-described first embodiment are designated by like reference characters.

In the second embodiment, cut-off valves 6' and 7' interposed between a first 15 and a second control chamber 17 in a hydraulic braking pressure control device 8' and the hydraulic braking pressure supply systems 4 and 5 are arranged so that they are closed in response to the movements of a free piston 16' and a control piston 18' in the hydraulic braking pressure control device 8' in a direction to increase the volumes of the control chambers 15 and 17.

A cylinder body 14' in the hydraulic braking pressure control device 8' is comprised of a cylindrical member 21' fitted into and fixed in a bottomed cylindrical member 20' through fitment structure (not shown) for inhibited relative rotation, and the cut-off valves 6' and 7' are mounted in the bottomed cylindrical member 20' in the cylinder body 14'. The free piston 16' has a tapered urging face 46 provided at a peripheral end of its fore end for operating the cut-off valve 6', and the control piston 18' has a tapered urging face 47 provided on an outer surface at an intermediate portion thereof for operating the cut-off valve 7'.

The cut-off valve 6' comprises a valve bore 48 which is communicated with the first control chamber 15 and is provided in the bottomed cylindrical member 20' with an axis of the bore 48 being perpendicular to the urging face 46, a valve chest 49 which is communicated with the first braking pressure supply system 4 and is provided in the bottomed cylindrical member 20' coaxially with the valve bore 48, a plug 50 threadedly mounted in the bottomed cylindrical member 20' to occlude an opposite end of the valve chest 49 from the valve bore 48, a tapered valve seat 51 formed at an opened end of the valve bore 48 closer to the valve chest 49, a valve member 52 contained in the valve chest 49, so that the member 52 can seat on the valve seat 51, a valve spring 53 mounted in a compressed manner between the valve member 52 and the plug 50 to bias the valve member 52 in a direction to seat on the valve seat 51, and a rod 54 integrally provided on the valve member 52 and loosely inserted through the valve bore 48, so that a leading end of the rod 54 abuts against the urging face 46.

With such cut-off valve 6', when the free piston 16' is in an advanced position as shown in FIG. 2, the valve member 52 is in its opened position to which it has been moved away from the valve seat 51 against a spring force of the valve spring 53 as a result of the rod 54 being urged by the urging face 46. If the free piston 16' is retreated by a given amount or more from the position shown in FIG. 2 to increase the volume of the first control chamber 15, the urging force given from the urging face 46 to the rod 54 is released, so that the valve member 52 is seated on the valve seat 52 to close the cut-off valve 6'.

The cut-off valve 7' comprises a valve bore 56 provided in the bottomed cylindrical member 20' to communicate with the second control chamber 17, and having an axis perpendicular to the urging face 47. A valve chest 57 is provided in the bottomed cylindrical member 20' coaxially with the valve bore 48 to communicate with the second hydraulic braking pressure supply system 5, and a plug 58 is threadedly mounted in the bottomed cylindrical member 20' to occlude an opposite end of the valve chest 57 from the valve bore 56. A tapered valve seat 59 is formed at an opened end of the valve bore 56 closer to the valve chest 57, with a valve member 60 contained in the valve chest 57 so that the member 60 can seat on the valve seat 59. A valve spring 61 is mounted in a compressed manner between the valve member 60 and the plug 58 to bias the valve member 60 in a direction to seat on the valve seat 59, and a rod 62 is integrally provided on the valve member 60 and loosely inserted through the valve bore 56 so that a leading end of the rod 62 abuts against the urging face 47.

With such cut-off valve 7', when the control piston 18' is in an advanced position as shown in FIG. 2, the valve member 60 is in its opened position to which it has been moved away from the valve seat 59 against a spring force of the valve spring 61 as a result of the rod 62 being urged by the urging face 47. If the control piston 18' is retreated by a given amount or more from the position shown in FIG. 2 to increase the volume of the first control chamber 17, the urging force given from the urging face 47 to the rod 62 is released, so that the valve member 60 is seated on the valve seat 59 to close the cut-off valve 7'.

Further, the cylindrical member 21' in the cylinder body 14' is provided with a position detecting means 63 for detecting the position of the control piston 18'. The position detecting means 63 comprises a moving rod 64 slidably received in the cylindrical member 21', so that it may be urged upwardly or radially outwardly, for example, by the sphere 32 of the retaining means 30, a movable contact 65 provided on an outer end of the moving rod 64, and a pair of stationary contacts 66, 66 which are brought into conductive contact through the movable contact 65 in response to a radial inward movement of the moving rod 64 as a result of releasing of the urging force given to the moving rod 64 by the sphere 32. The position detecting means 63 is disposed such that the conductive contact between both the stationary contacts 66 and 66 is released when the control piston 18' is in its advanced position. A signal from the position detecting means 63 is applied to the control unit 45 and used for detection of any trouble of the hydraulic braking pressure control device 8' in combination with an operating signal for the motor 19.

In addition to the effect obtained by the previously described first embodiment, the second embodiment provides an effect that control of the opening and closing of the cut-off valves 6' and 7' can be carried out only by controlling the operation of the motor 19 without use of more expensive solenoid valves and without a control circuit for controlling the opening and closing of the cut-off valves 6' and 7'.

When effecting traction control in the second embodiment, the control piston 18' is retreated by the motor 19 thereby retreating the free piston 16', to close the cut-off valves 6' and 7'. With the cut-off valves 6' and 7' closed, the traction control devices 9 and 10 can be operated, thereby increasing the braking pressure in the brake devices $B_{RL}$ and $B_{RR}$. On the other hand, since each of the cut-off valves 6' and 7' is constructed as a one-way valve permitting a return of working oil toward the master cylinder 3 and therefore, the loading of each of the valve springs 53 and 61 is determined so as to maintain the closed states of the cut-off valves against the hydraulic pressures generated and increase in the first and second control chambers 15 and 17 during the traction control. Even if the loading of the valve springs 53 and 61 is set at a relatively large level in this manner, the cut-off valves 6' and 7' are mechanically operated by the free piston 16' and the control piston 18' and hence, any influence cannot be exerted during antilock control.

Although the motor 19 has been used as the positioning control means in the above embodiments, it will be understood that a hydraulic pressure may be applied to a back of the control piston 18, 18', and the axial position of the control piston 18, 18' may be controlled by controlling that hydraulic pressure.

What is claimed is:

1. A hydraulic braking pressure control device for a vehicle having first and second wheels disposed on one axle, first and second brake devices for the wheels, and a tandem type master cylinder provided with first and second output ports, said hydraulic braking pressure control device comprising:
    a cylinder body of a bottomed cylindrical shape;
    a free piston slidably received in said cylinder body to define a first control chamber between said free piston and a closed end of said cylinder body;
    a control piston slidably received in said cylinder body to define a second control chamber between said control piston and said free piston; and
    a positioning control means for controlling an axial position of said control piston,
    wherein said first and second control chambers are independently interposed in first and second hydraulic braking pressure supply systems, respectively, which feed pressurized hydraulic fluid generated from the output ports of the master cylinder for operating the brake devices, and
    wherein cut-off valves are also interposed in the respective hydraulic braking pressure supply systems and are each operable to be switched-over between a connection state and a disconnection state.

2. The device according to claim 1, wherein said positioning control means comprises a drive means having a shaft which is connected to said control piston and drives the control piston in an axial direction in the cylinder body and wherein a retainer means is provided between said control piston and said cylinder body for inhibiting rotation of said control piston relative to the cylinder body.

3. The device according to claim 1, wherein said cut-off valves are closed in response to movements of said free piston and said control piston in a direction to increase volume in each of the control chambers.

4. The device according to claim 3, wherein said cut-off valves are integrally formed in said cylinder body and each of the cut-off valves comprises a valve seat and a valve member seatable on the valve seat, each said valve member having a rod which is urged by one of said control piston and said free piston, when the control piston and the free piston are moved in a direction to reduce the volume of each of the control chambers, thereby to bring the cut-off valve into said connection state.

5. The device according to claim 1, wherein said cut-off valves are interposed in the respective hydraulic braking pressure supply systems at locations closer to the output ports of the master cylinder than the control chambers.

6. The device according to claim 5, wherein the vehicle has further brake devices for wheels disposed on another axle, and said further brake devices are connected to said first and second hydraulic braking pressure supply systems, respectively, at locations upstream of the cut-off valves.

7. The device according to claim 1, wherein traction control means are interposed in said first and second hydraulic braking pressure supply systems, respectively, at locations downstream of the control chambers.

8. The device according to claim 1, further comprising position detecting means for detecting the axial position of said control piston which is established by said positioning control means.

9. The device according to claim 1, wherein said cut-off valves are integrally formed in said cylinder body.

10. A hydraulic braking pressure control system for a vehicle having wheels disposed on one axle, comprising:
    a tandem-type master cylinder having output ports for supplying pressurized hydraulic fluid from the output ports;
    a first brake means for applying braking pressure to one of said wheels;
    a second brake means for applying braking pressure to another wheel of said wheels;
    a first hydraulic braking pressure supply system for feeding pressurized hydraulic fluid from one of the output ports of the master cylinder for operating said first brake means;
    a second hydraulic braking pressure supply system for feeding pressurized hydraulic fluid from another of the output ports for operating said second brake means;
    a hydraulic pressure control means for controlling pressure fed from said output ports of the master cylinder;

a first traction control means interposed between said first brake means and said hydraulic pressure control means for controlling traction of said one wheel by selective application of braking pressure to said first brake means; and a second traction control means interposed between said second brake means and said hydraulic pressure control means for controlling traction of said another wheel by selective application of braking pressure to said second brake means;

wherein said hydraulic pressure control means comprises:

a) a cylinder body of a bottomed cylindrical shape;
b) a free piston slidably received in said cylinder body to define a first control chamber between said free piston and a closed end of said cylinder body, said first control chamber being connected to said one output port of the master cylinder and leading to said first brake means;
c) a control piston slidably received in said cylinder body to define a second control chamber between said free piston and said control piston, said second control chamber being connected to said another output port of the master cylinder and leading to said second brake means; and
d) a positioning control means coupled to said control piston for controlling an axial position of said control piston;

wherein said first and second control chambers are independently interposed in said first and second hydraulic braking pressure supply systems, respectively, and cut-off valves are interposed in the respective hydraulic braking pressure supply systems and are each operable to be switched-over between a connection state and a disconnection state.

11. The device according to claim 10, wherein said positioning control means comprises a drive means having a shaft which is connected to said control piston and drives the control piston in an axial direction in the cylinder body and wherein a retainer means is provided between said control piston and said cylinder body for inhibiting rotation of said control piston relative to the cylinder body.

12. The device according to claim 10, wherein said cut-off valves are closed in response to movements of said free piston and said control piston in a direction to increase volume in each of the control chambers.

13. The device according to claim 12, wherein said cut-off valves are integrally formed in said cylinder body and each of the cut-off valves comprises a valve seat and a valve member seatable on the valve seat, said valve member having a rod which is urged by one of said control piston and said free piston, when the control piston and the free piston are moved in a direction to reduce the volume of each of the control chambers, thereby to bring the cut-off valve into said connection state.

14. The device according to claim 12, wherein said cut-off valves are interposed in the respective hydraulic braking pressure supply systems at locations closer to the output ports of the master cylinder than the control chambers.

15. The device according to claim 14, wherein the vehicle has further brake devices for wheels disposed on another axle, and said further brake devices are connected to said first and second hydraulic braking pressure supply systems, respectively, at locations upstream of the cut-off valves.

16. The device according to claim 10, wherein traction control means are interposed in said first and second hydraulic braking pressure supply systems, respectively, at locations downstream of the control chambers.

17. The device according to claim 10, further comprising position detecting means for detecting the axial position of said control piston which is established by said positioning control means.

18. The device according to claim 10, wherein said cut-off valves are integrally formed in said cylinder body.

19. A hydraulic braking pressure control system for a vehicle having left and right wheels disposed on one axle, comprising:

a hydraulic pressure supply means for supplying pressurized hydraulic fluid;
a hydraulic pressure control means for controlling pressurized hydraulic fluid which is fed from said supply means, said hydraulic pressure control means including a microcomputer which is operable to output a control signal for controlling slip of the wheels;
a first brake means coupled to said hydraulic pressure control means for applying braking pressure to one wheel of said wheels;
a second brake means coupled to said hydraulic pressure control means for applying braking pressure to another wheel of said wheels;

wherein said hydraulic pressure control means further comprises:

a) a cylinder body of a bottomed cylindrical shape;
b) a free piston slidably received in said cylinder body to define a first control chamber between said free piston and a closed end of said cylinder body, said first control chamber leading to said first brake means;
c) a control piston slidably received in said cylinder body to define a second control chamber between said free piston and said control piston, said second control chamber leading to said second brake means; and
d) a positioning control means coupled to said control piston for controlling an axial position of said control piston, said positioning control means being controlled by the control signal from said microcomputer;

wherein said first and second control chambers are independently interposed in said first and second hydraulic braking pressure supply systems, respectively, and cut-off valves are interposed in the respective hydraulic braking pressure supply systems and are each operable to be switched-over between a connection state and a disconnection state.

20. The system according to claim 19, wherein said cut-off valves are located in the respective hydraulic braking pressure supply systems upstream of said control chambers, respectively, and these cut-off valves are operable to assume said disconnection state when said control piston is axially moved by said positioning control means to increase volume in each of the control chambers.

* * * * *